(12) United States Patent
Chandra et al.

(10) Patent No.: US 7,210,008 B2
(45) Date of Patent: Apr. 24, 2007

(54) MEMORY CONTROLLER FOR PADDING AND STRIPPING DATA IN RESPONSE TO READ AND WRITE COMMANDS

(75) Inventors: Prashant R. Chandra, Sunnyvale, CA (US); Sridhar Lakshmanamurthy, Sunnyvale, CA (US); Chen-Chi Kuo, Pleasanton, CA (US); Rohit Natarajan, Sunnyvale, CA (US); Mark Rosenbluth, Uxbridge, MA (US)

(73) Assignee: Intel Corporation, Santa Clara, CA (US)

( * ) Notice: Subject to any disclaimer, the term of this patent is extended or adjusted under 35 U.S.C. 154(b) by 423 days.

(21) Appl. No.: 10/741,298

(22) Filed: Dec. 18, 2003

(65) Prior Publication Data

US 2005/0135367 A1 Jun. 23, 2005

(51) Int. Cl.
*G06F 12/00* (2006.01)
(52) U.S. Cl. .................. 711/154; 711/202; 710/66
(58) Field of Classification Search .................. None
See application file for complete search history.

(56) References Cited

U.S. PATENT DOCUMENTS

| | | | | |
|---|---|---|---|---|
| 6,065,070 A | * | 5/2000 | Johnson | 710/22 |
| 6,145,017 A | * | 11/2000 | Ghaffari | 710/5 |
| 6,185,633 B1 | * | 2/2001 | Johnson | 710/22 |
| 6,820,186 B2 | * | 11/2004 | Webber et al. | 711/219 |
| 2001/0030976 A1 | * | 10/2001 | Turner | 370/474 |
| 2003/0101426 A1 | * | 5/2003 | Sarkinen et al. | 716/12 |
| 2003/0172243 A1 | * | 9/2003 | Ripley | 711/202 |
| 2003/0227925 A1 | * | 12/2003 | Matsuo et al. | 370/395.32 |
| 2003/0235194 A1 | * | 12/2003 | Morrison | 370/389 |
| 2004/0085897 A1 | * | 5/2004 | Jacobi et al. | 370/229 |

OTHER PUBLICATIONS

Structured Computer Organization, fifth edition, By Andrew S. Tanenbuam. published 1999. pp. 5,8.*

* cited by examiner

*Primary Examiner*—Hyung Sough
*Assistant Examiner*—Kaushik Patel
(74) *Attorney, Agent, or Firm*—Grossman, Tucker, Perreault & Pfleger, PLLC

(57) ABSTRACT

A memory controller that includes an interface to a first memory and an interface to a bus coupling the memory controller to at least one processor. The controller also includes circuitry, responsive to read and write commands received over the bus from the at least one processor, to shift data by an amount identified by at least some of the read and write commands.

9 Claims, 17 Drawing Sheets

MEMORY CONTROLLER FOR PADDING AND STRIPPING DATA IN RESPONSE TO READ AND WRITE COMMANDS

BACKGROUND

Networks enable computers and other devices to communicate. For example, networks can carry data representing video, audio, e-mail, and so forth. Typically, data sent across a network is divided into smaller messages known as packets. By analogy, a packet is much like an envelope you drop in a mailbox. A packet typically includes "payload" and a "header". The packet's "payload" is analogous to the letter inside the envelope. The packet's "header" is much like the information written on the envelope itself. The header can include information to help network devices handle the packet appropriately. For example, the header can include an address that identifies the packet's destination. Much like one envelope stuffed inside another, one or more packets may be stored within another packet. This is known as "encapsulation".

Some packet processing systems use programmable devices known as network processors. Network processors enable software programmers to quickly reprogram network processor operations, for example, to adapt to changing protocols or provide new features. Some network processors feature multiple processing engines to share packet processing duties. For instance, while one engine determines how to forward one packet further toward its destination, a different engine determines how to forward another. This enables the network processors to achieve high packet processing speeds while remaining programmable.

DETAILED DESCRIPTION

How data is arranged in memory can greatly affect performance of a system. For example, some arrangements of packet data in memory can reduce the number of memory read and write operations needed to process the packet. Packet data may also be arranged to place packet portions of interest in readily determined locations reducing the time required to search through the packet data in memory.

Figure 1A:
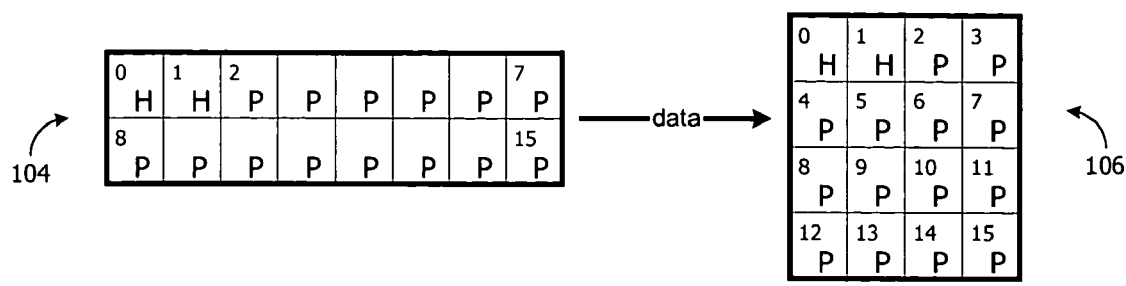
FIG. 1A is a diagram illustrating transfer of data between memories having different widths.

To illustrate the impact of data arrangement, FIG. 1A depicts the arrangement of a packet in memory 104. The "H"-s represent the packet's header while the "P"-s represent the packet payload. The numbers in the upper left hand corner of each memory 104 location identify the memory 104 address of the location. For example, the first payload byte is stored in the location at address "2".

The memory 104 is depicted as rows of bytes. The width (e.g., 8-bytes) of these rows corresponds to the amount of memory read or written at a time. For example, to access the value at byte-3, a read operation can be used to retrieve the entire row (i.e., byte-0 to byte-7).

As shown in FIG. 1A, the packet data may be moved from one memory 104 ("the source", another 106 ("the target", shown, the target memory 106 may have a different memory width than memory 104. For example, instead of an 8-byte wide random access memory, memory 106 may be formed from an array of 4-byte registers.

The transfer illustrated in FIG. 1A copied each packet byte in memory 104 to a byte in memory 106. The different memory widths, however, result in the different arrangement of the data within the memories 104, 106. The arrangement of the packet in memory 106, however, may not be the best for a given packet processing operation. For example, a routing operation may need to access the first four bytes of the payload (e.g., the header bytes of an encapsulated packet). In FIG. 1A, the first four payload bytes could be accessed using two read operations of memory 106 (i.e., one read to access bytes 2 and 3 and a second read to access bytes 4 and 5) and performing a subsequent shift operation.

Figure 1B:
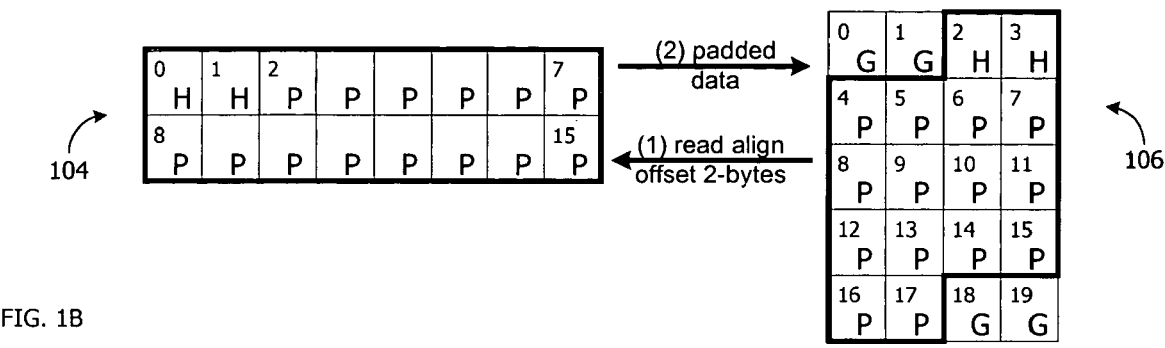
FIG. 1B is a diagram illustrating shifting of data read from a memory.

FIG. 1B illustrates an alternate arrangement of the packet's data. As shown, the packet data is padded with garbage bytes (labeled "G", that align the start of the payload along the boundary of memory 106. For example, as shown, the addition of garbage bytes shifts the first payload byte, byte-2, in memory 104 to byte-4 in memory 106. In addition to aligning the first byte of the payload within memory 106, the first four bytes of payload (i.e., bytes 4–7 of memory 106) may now be accessed with a single read operation instead of two reads and a shift as in FIG. 1A.

The number of garbage bytes used to pad the packet data may vary. For example, the length of a header may vary across protocols or even across packets. Thus, the payload may start at different positions within different packets. Software control of the alignment, however, permits flexible adaptation to different packet structures. For instance, the payload of a packet having a two-byte header (as shown) can be aligned by padding the packet data with two beginning garbage bytes. A packet having a three-byte header (not shown) would only need a single garbage byte of padding.

The data configuration shown in FIG. 1B may be controlled by a software instruction that specifies how to align the data in memory 106. For example, an instruction may result in a memory command (1) that identifies an offset of two-bytes. In response, to this command, a component (e.g., a memory controller 100) can (2) shift the retrieved data by padding the data with an appropriate number of "garbage" bytes. As shown, the component may also pad the end of the data such that the padded data completely occupies a row or register of a target memory 106. Alignment of data by software controlled hardware can provide fast but flexible alignment of data.

A similar approach may be used when writing data to memory 104. For example, an instruction may result in a memory command that reverses the previous shifting operation by stripping the previously added garbage bytes before writing the data. By over-writing memory with the stripped data, read-modify-write operations may be reduced.

FIGS. 2A–2E illustrate sample operation of a processor using techniques described above. The processor shown in FIG. 2A includes multiple programmable engines 102a–102n that execute instructions (not shown) in parallel.

The engines 102 include local storage 106a (e.g., local random access memory and/or an array of registers) of their own, but also share access to memory 104. In the example shown, memory 104 stores 16-bytes of a packet.

To read or write data to memory 104, the engines send commands to memory controller 100. The controller 100 can queue or arbitrate between commands received from the engines 102. As shown, engine 102a may send a command requesting a read of 16-bytes of memory 104 into local memory 106a. The command specifies an offset (e.g., 2) identifying which byte should be aligned in the local memory 106. In response to the command, read-align logic (e.g., hardware to shift data) is configured to shift the retrieved 16-bytes by 2-bytes. This amount to shift can be computed as:

(shift amount)=(target memory width)−(offset).

Figure 2A:
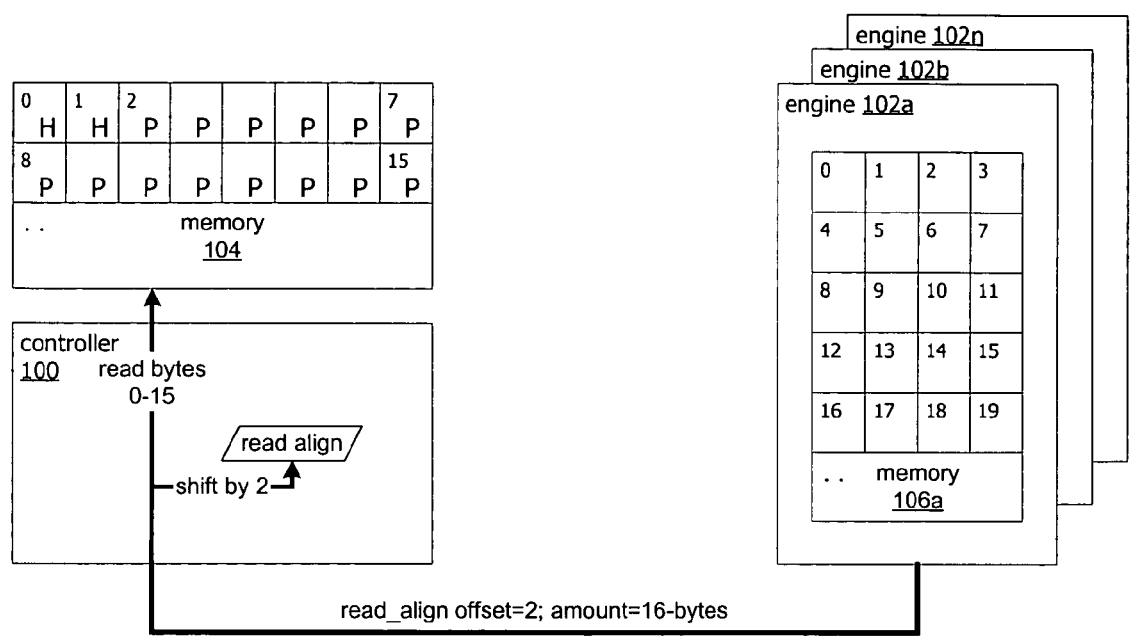
FIGS. 2A–2E are diagrams that illustrate a sequence of operations that shift and transfer data between memories having different widths.
Figure 2B:
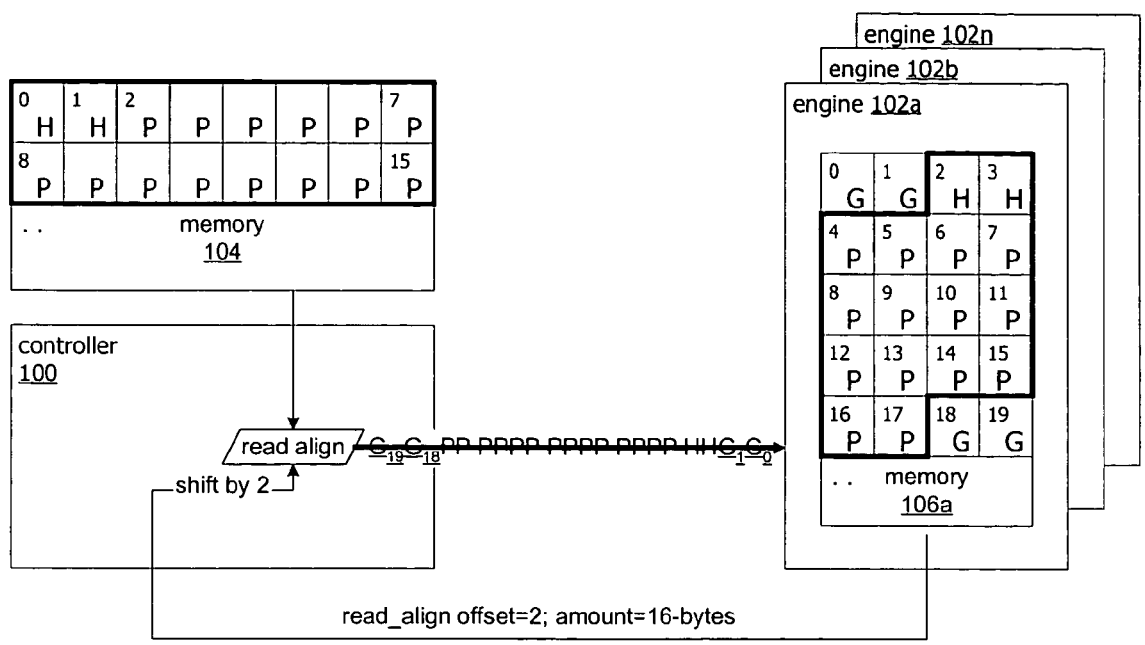
Figure 2C:
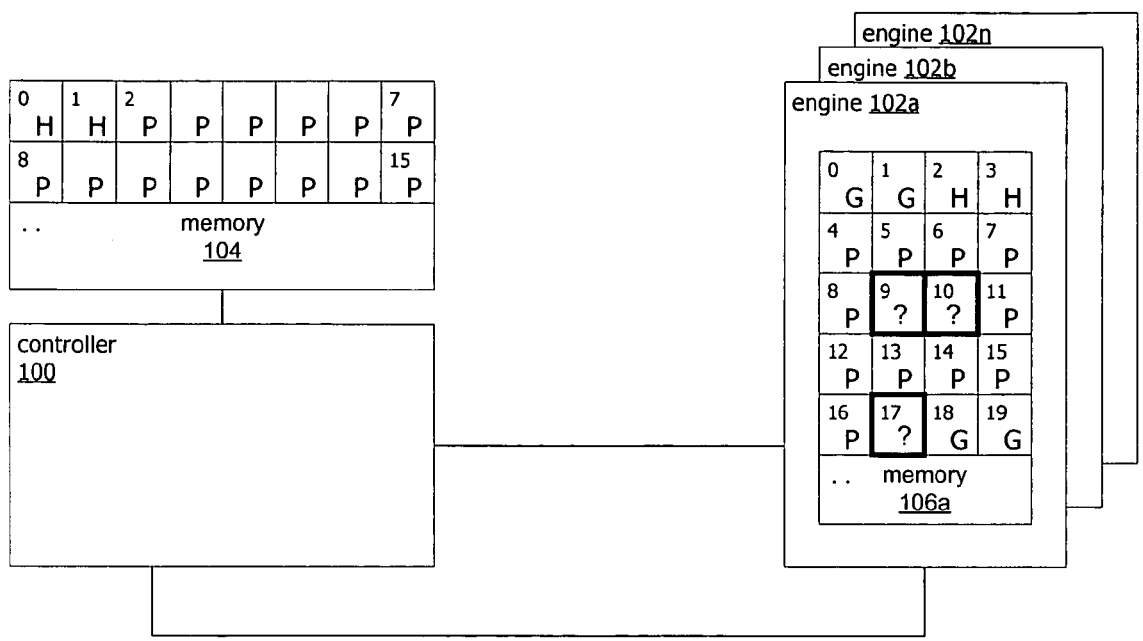

The memory controller 100 initiates read operations to retrieve the data. As shown in FIG. 2B, after retrieving the 16-bytes, the read align logic pads the retrieved data with a two garbage byte prefix (G0, G1) to shift the data by the requested amount. The logic also pads the data with a two garbage byte suffix (G18, G19) so that the padded data completely fills rows of memory 106 instead of having a final "partially" filled row. As shown, the padded data aligns the payload as desired within memory 106a.

In the course of processing the packet, engine 102a may alter some of the packet's payload. For example, in FIG. 2C, byte-9, byte-10, and byte-17 (identified by deltas) were altered. For instance, the engine 102a may reroute a web-request to a different server by altering a Universal Resource Locator (URL) included in the packet, change a Transmission Control Protocol (TCP) checksum, or alter the destination address of a packet.

Figure 2D:
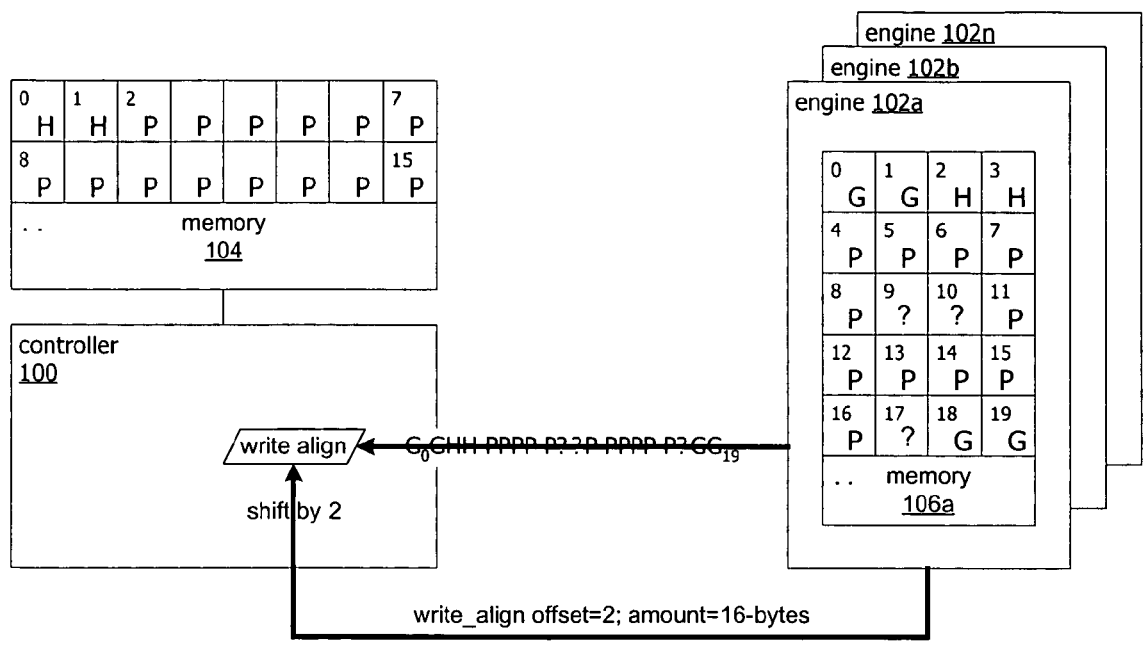

As shown in FIG. 2D, after modifying the packet, the engine 102a executes an instruction to write the packet data back to memory 104. As shown, the instruction causes the engine 102a to issue a command to write 16-bytes of local storage to memory 104 address 0. The command also instructs write align logic to perform a reverse shift of two-bytes. That is, by specifying an offset of "2", the write align logic can determine that a "2" garbage byte prefix and suffix were previously added to the data and that the garbage data should be stripped before writing.

Figure 2E:
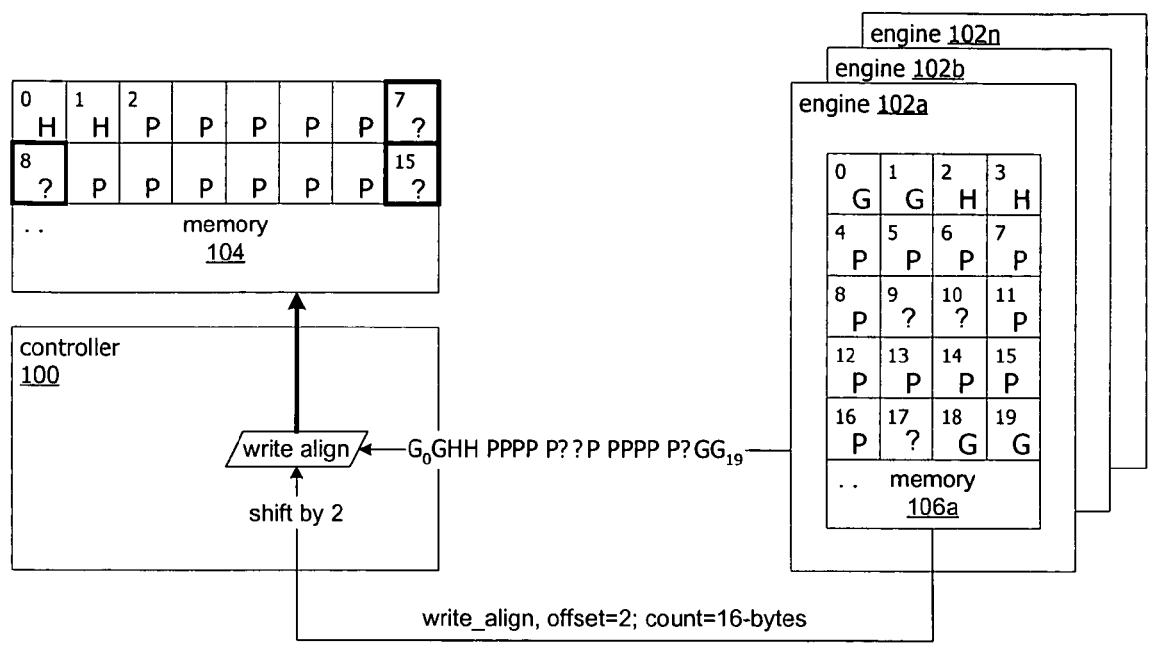

As shown in FIG. 2E, the write align logic strips the garbage bytes previously added to pad the data. The controller 100 then over-writes memory 104 with the stripped data, altering the modified bytes without performing a "read-modify-write" the controller 100.

As illustrated, the memory controller 100 circuitry handled the low-level tasks of padding and stripping while engine 102a software controlled these operations such that the controller 100 shift logic added and removed garbage bytes. This decoupling of operations enables the controller 100 to be simply constructed while saving software execution cycles that would have otherwise be used to manipulate the data.

FIGS. 2B and 2D both depicted commands issued in response to engine instructions. The instructions can be included in source code for assembly and/or compilation into target code executable by an engine. The source code instructions may have a variety of syntaxes and parameters. For example, the read instruction may have a syntax of:

memory_identifier [read$_{13}$align, $xfer, addr1, addr2, ref_cnt], opt_tok where the "memory_identifier" identifies a memory (e.g., external SRAM or DRAM) and the "read_align" parameter distinguishes the command from conventional read instructions. The "$xfer" (transfer register) parameter identifies the starting register of register array 106a to store the aligned data. Briefly, a transfer register is a register within an engine that buffers data exchanged with the memory controller 100. The addresses specified by "addr1" and "addr2" are added to determine the offset. The first six bits of the sum identify a memory row, while the last two identify the offset. The identified offset results in a "rightward" shift of (target memory width)−(offset). The "ref_cnt" parameter identifies how many longwords to retrieve from memory. Finally, the "opt_tok" (optional token) has a syntax of:

[ctx_swap[signal],][done]].

The ctx_swap parameter instructs an engine 102 to swap to another engine thread of execution until a signal indicates completion of the read operation. This enables other threads to perform operations while the read proceeds. The sig_done parameter also identifies a status signal to be set upon completion of the fetch, but does not instruct the engine 102 to swap contexts.

The write align instruction may have a similar syntax. For example, the write align instruction may have a syntax of:

memory_reference[write_align, $xfer, addr1, addr2, ref_cnt], opt_tok where the parameters represent the same values as the read align command. For example, the offset identified by the last two bits of the sum of addr1 and addr2 yields a reverse shift of (transfer memory width)−(offset) bytes before writing the contents of the specified transfer registers into the controlled memory.

Again, the syntaxes described above are merely examples and other implementations may feature different keywords, parameters, options, and so forth. Additionally, the instruction may exist at different levels of code. For example, the instruction may be part of the instruction set of an engine. Alternately, the instruction may be processed by a compiler or assembler to generate target instructions (e.g., engine executable instructions) corresponding to the source code alignment instruction.

Figure 3:
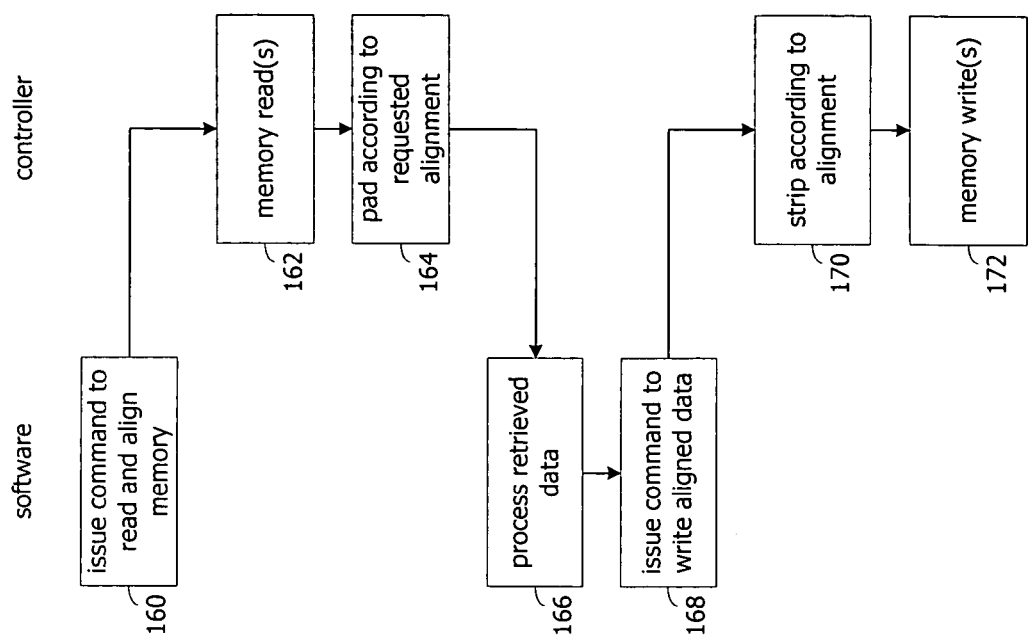
FIG. 3 is a flow-chart of a process to shift and transfer data between memories having different widths.

FIG. 3 is a flow-chart illustrating the sample sequence shown in FIG. 2. As shown, a software instruction (e.g., an instruction of an engine thread), causes an engine to issue 160 a read align command requesting data and identifying the desired alignment. The memory controller receives the command, then retrieves 162 and pads 164 the requested data. The software continues operations 166 (e.g., packet processing) and potentially modifies the read data.

As shown, software subsequently encounters an instruction that causes the engine to issue 168 a write align command to the memory controller 100. In response to the command, the controller 100 strips 170 the identified data of previously added padding and writes 172 the data to memory.

Techniques described above can be used to enhance performance in a wide variety of environments. For example, the techniques can be used to align packet data based on the structure of the memory rather than an alignment dictated by the packet structure. For example, most of the link layer protocols (layer 2) used in the Internet today (Ethernet, Packet-Over-Sonet (POS)) have headers that are aligned on a 2-byte boundary. However, many computer systems that typically form the end-point of the network often feature 4-byte boundaries. This can create a mismatch between the alignment of the packet data (2-byte) and the natural alignment of the end-system (4-byte). Thus, an encapsulated packet (e.g., an Internet Protocol (IP) datagram or Transmission Control Protocol (TCP) segment) is unlikely to be aligned along a memory boundary. Techniques described above, however, can be used to speed packet processing operations. These savings can become considerable, particularly, in high-speed packet processing where memory bandwidth and compute cycles become critical resources.

FIGS. 4A to 4F illustrate operation of a computer program 122 using the alignment techniques described above to align a packet 128 in memory 104. In the scheme illustrated by FIGS. 4A–4F, packets arrives piecemeal as a series of packet segments in receive buffer 120. This packet segmentation may be due, for example, to a component, such as a framer, that breaks-up different packets received over different ports into uniform portions (e.g., 64-bytes). This enables more uniform servicing of the ports despite the potentially varying sizes of packets being received.

In FIGS. 4A–4F, a packet is divided into segments that include a "start of packet" segment 128a and, potentially, one or more "middle of packet" segments, and an "end of packet" segment. These labels are not necessarily exclusive. That is, if a packet is small enough, a segment may be labeled as both the starting and ending segment of a packet.

The different packet segments are processed by instructions 122 executed by engine 102a. These instructions reconstruct a packet by accumulating the different packet segments in consecutive bytes in memory 104. To align the packet within memory 104, the instructions 122 can use the memory controller shifting capabilities described above. The alignment capabilities can, however, potentially introduce stretches of garbage bytes within the accumulating packet. That is, a command to write-align an entire packet segment in memory 104 could result in appendage of garbage bytes to the end of the segment in memory 104. If subsequent packet segments were appended immediately after the inserted garbage bytes, the resulting packet could include multiple stretches of garbage bytes separating the segments. To avoid these garbage "holes", FIGS. 4A to 4F illustrate an approach that temporarily buffers the ending portion of a segment that would otherwise cause garbage padding. That is, the last "L" segment bytes that would occupy only a portion of a memory row are buffered as "residue" instead of being padded with a garbage suffix and written along with the rest of the segment data. The residue is saved until the following packet arrives with sufficient data to fill a row in memory 104. When an end of packet segment arrives, remaining residue is flushed to memory.

Figure 4A:
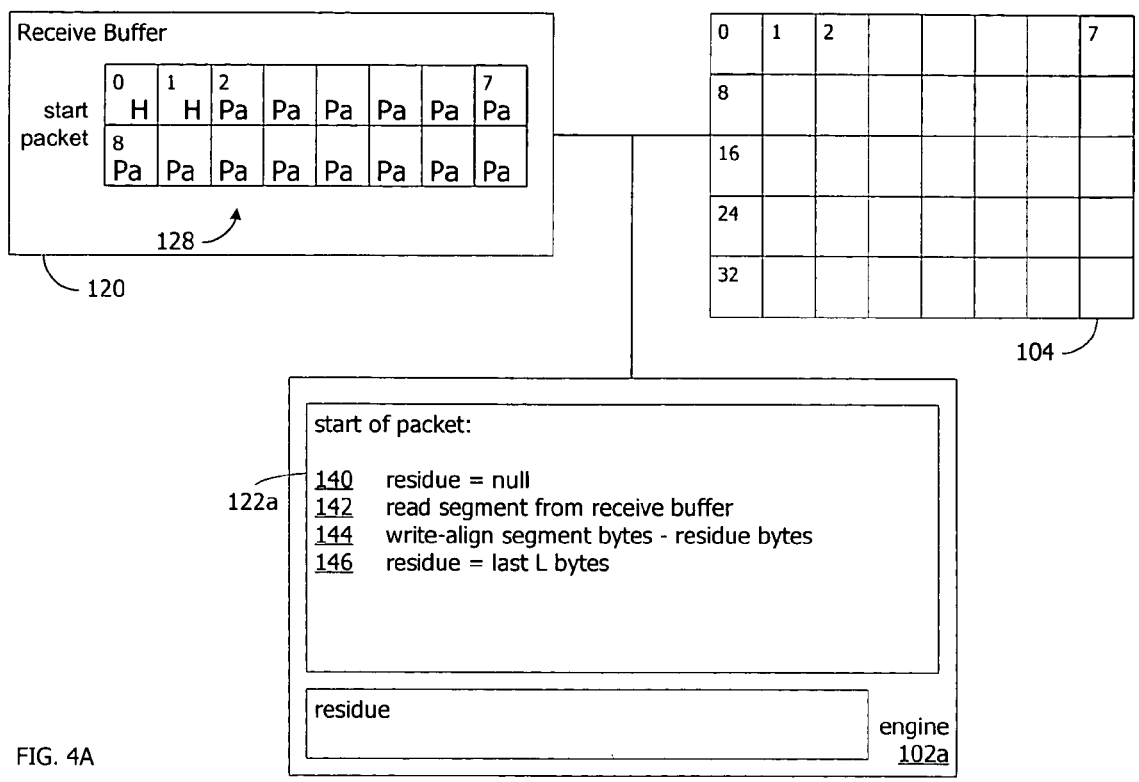
FIGS. 4A–4F are diagrams that illustrate a sequence of operations that align data in a memory.
Figure 4B:
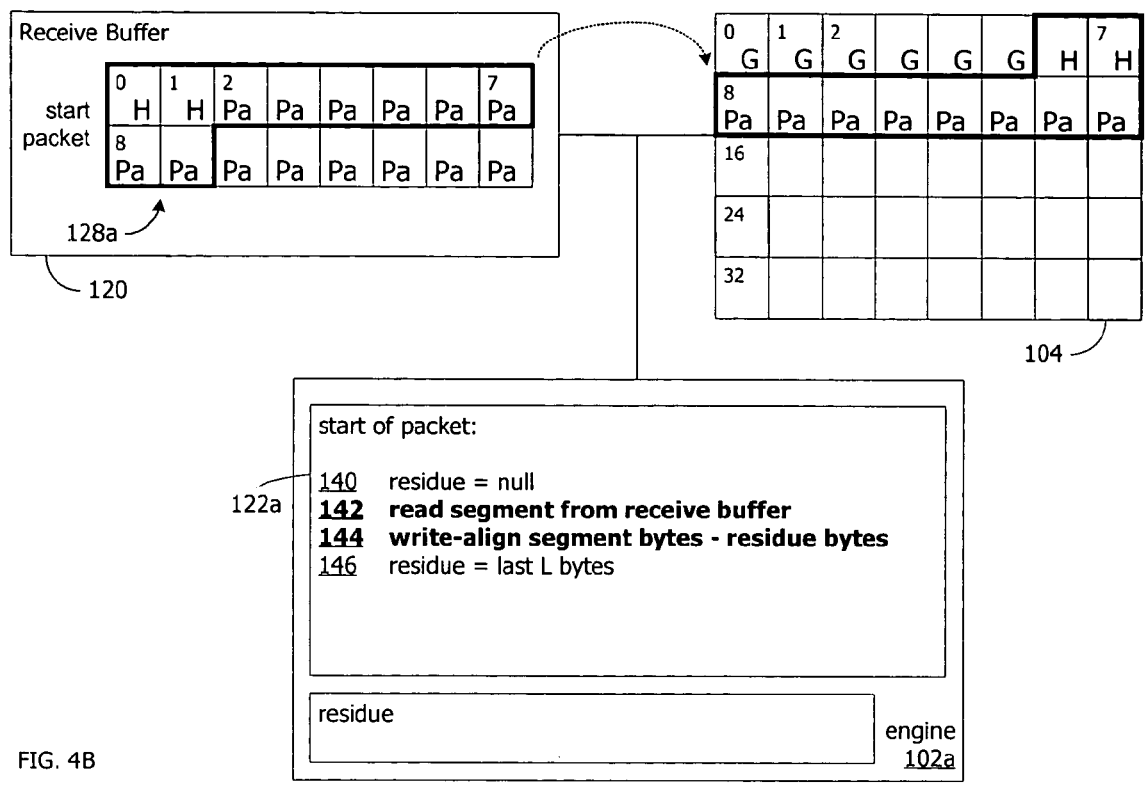

In greater detail, as shown in FIG. 4B, a read instruction 142 reads data in a "start of packet" segment. A following write-align instruction 144 writes a subset of the data to memory 104. To align the packet payload in memory 104, the instruction 144 identifies an offset of "2", causing the memory controller (not shown in FIG. 4) to shift the data by 6-bytes (i.e., 6-bytes=(memory width of 8-bytes)–(offset of 2-bytes)). The shift will align the packet's payload along the quadword (8-byte) boundary of memory 104. The segment subset write aligned excludes "L" trailing residue bytes where L is determined as the (memory width)–(offset). Thus, write-aligning the data does not cause inserting of a garbage suffix.

Figure 4C:
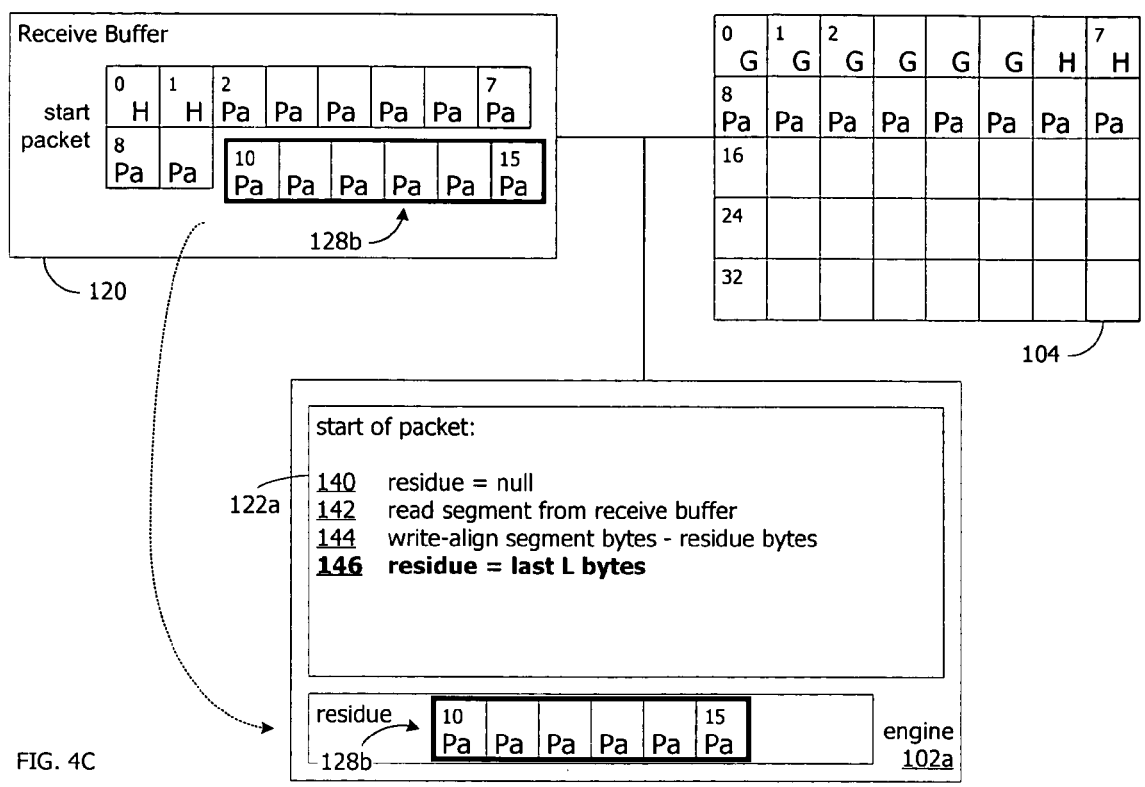

As shown in FIG. 4C, the residue 128b is stored by engine 102a. The residue 128b may be saved in local memory of the engine or in another memory such as external SRAM. Since segments from many different packets may be interleaved as they arrive in receive buffer 120, the engine 102a may buffer many packet residues at a time. This residue may form part of a packet context that includes other packet data such as the location in memory 104 to continue writing segments of a given packet.

Figure 4D:
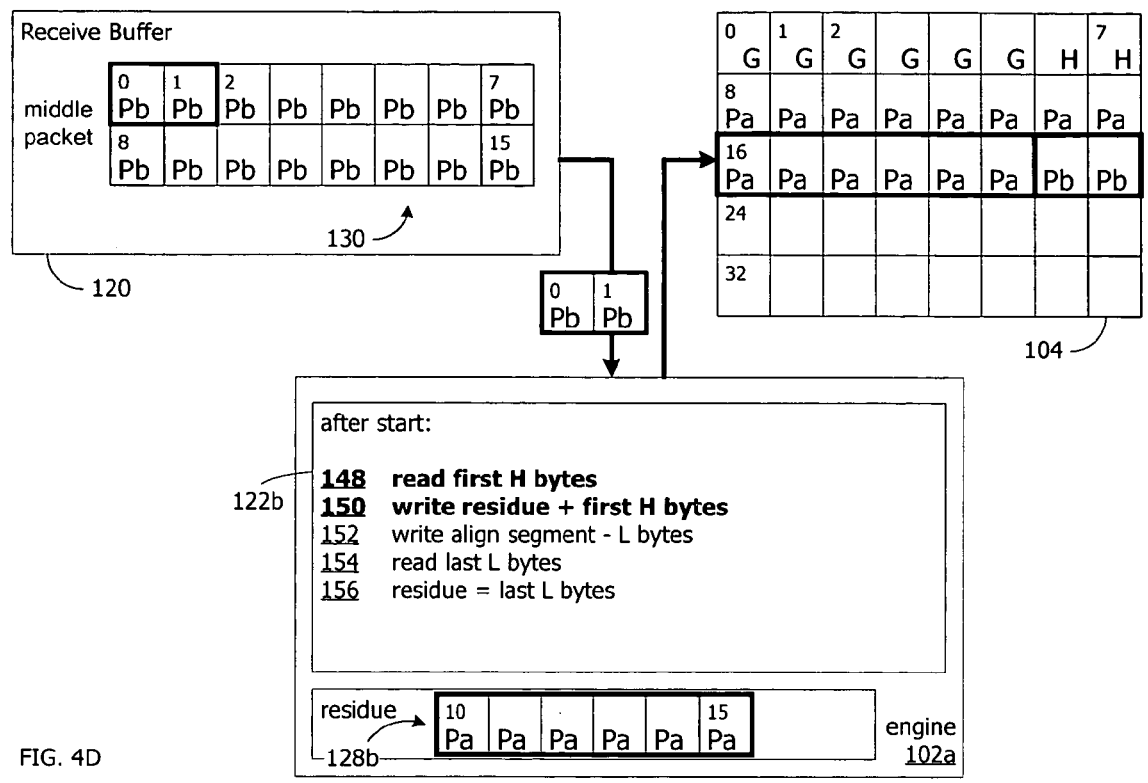
Figure 4E:
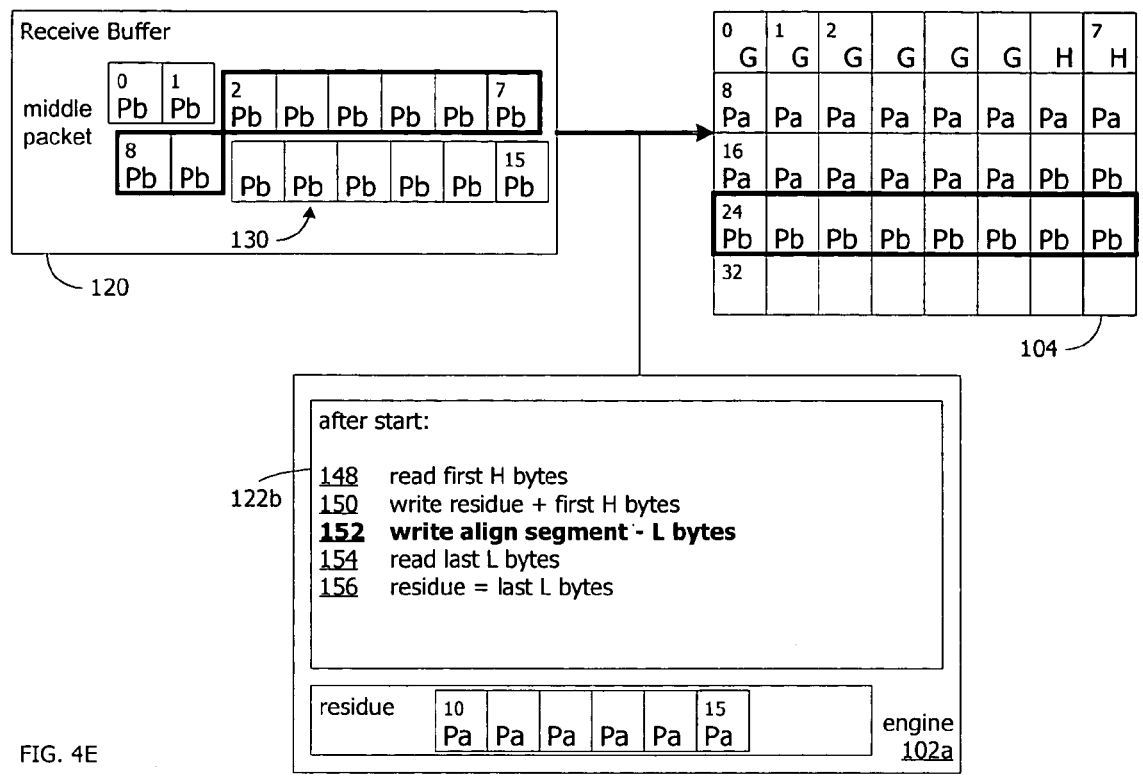

As shown in FIG. 4D, after another segment 130 for the packet arrives in receive buffer 120, the engine instructions 122b read H 148 starting bytes of the segment 130 to completely fill a row of memory 104 when combined 150 with the previous residue 128b bytes. For example, as shown, the first two bytes of segment 130 are added to the previously stored 6-byte residue and written to memory 104. As shown, in FIG. 4E, the process then continues accumulation of the packet in memory 104 for the remaining bytes in the segment. That is the remaining bytes, excluding the last "L" bytes that would cause garbage "holes", are written 152 to memory. For example, a write align operation may write segment data excluding the already written H bytes and the ending L bytes. As shown, an instruction may be provided that causes direct transfer of bytes from the receive buffer 120 to memory 104 without traveling through engine 102a.

Figure 4F:
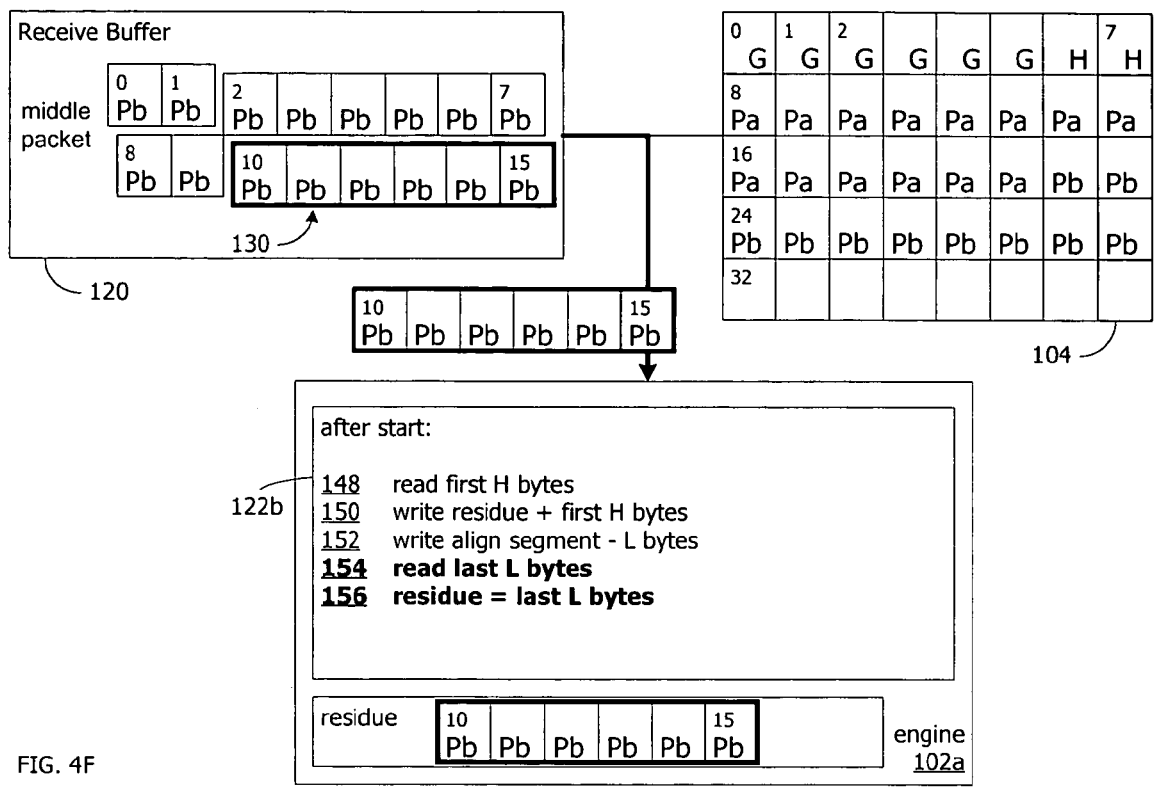

As shown in FIG. 4F, the remaining bytes are saved as residue. The operations illustrated in FIGS. 4D–4F repeat as additional segments arrive. After an end of packet segment is processed, any remaining residue is flushed to the memory.

Many variations of the above possible. For example, for packets that fit in entirely within one segment, alignment may be performed completely in hardware since no software action is required to fill in the holes. Additionally, residue bytes of an end of packet segment need not be handled separately from other bytes in the segment. Further, in many cases it is not necessary to write the initial (e.g., link layer header) bytes from a start of packet segment.

In the scheme above, the engine software handles the task of maintaining contexts for different packets instead of burdening the memory controller 100 with this task. Thus, scalability is provided by the engines instead of the controller 100.

Figure 5:
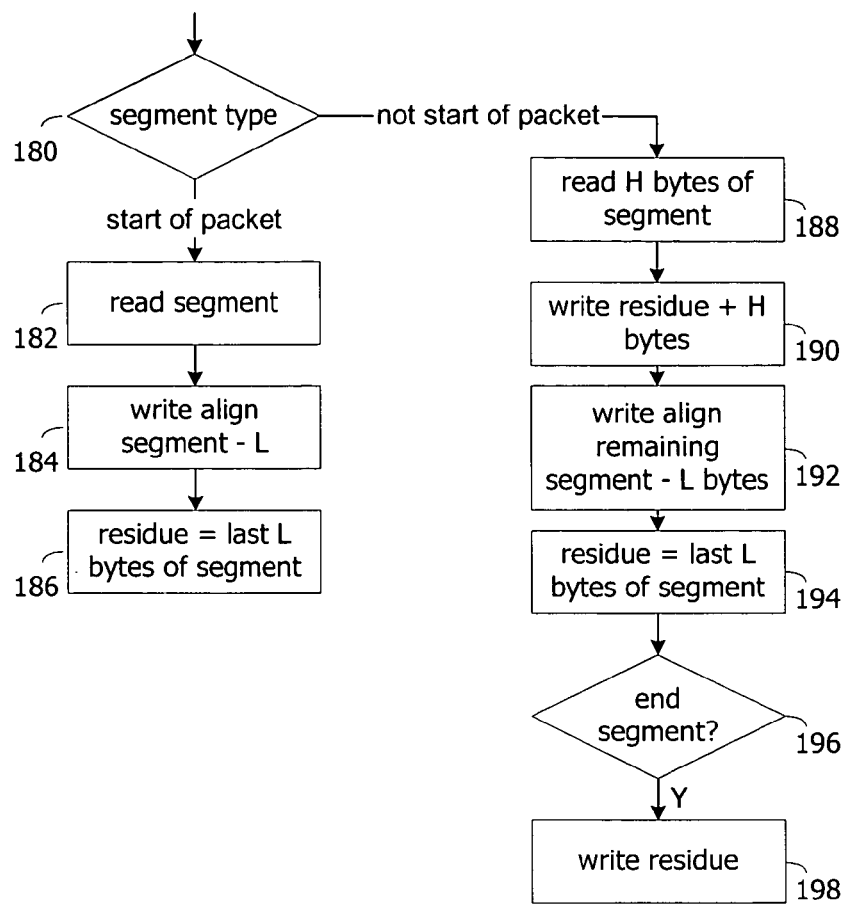
FIG. 5 is a flow-chart of a process to align data in memory.

FIG. 5 depicts a flowchart of a process implementing the scheme illustrated above. As shown, the process identifies 180 the type of segment. For "start of packet" segments, the segment is read 182 from the receive buffer. The bytes of segment, other than the L-bytes of the residue, are write aligned 184 to memory. The remaining L bytes are saved 186 as residue. For other segments, the residue is combined 188 with the first [(target memory width)–L] bytes read 186 from the segment and written 190 to memory. The next remaining bytes of the segment, other than the last L bytes, are write aligned 192 to memory. The residue is then updated 194 with the ending L bytes of the segment. For "end of segment" packets 196, the residue is flushed 198 to memory.

Figure 6:
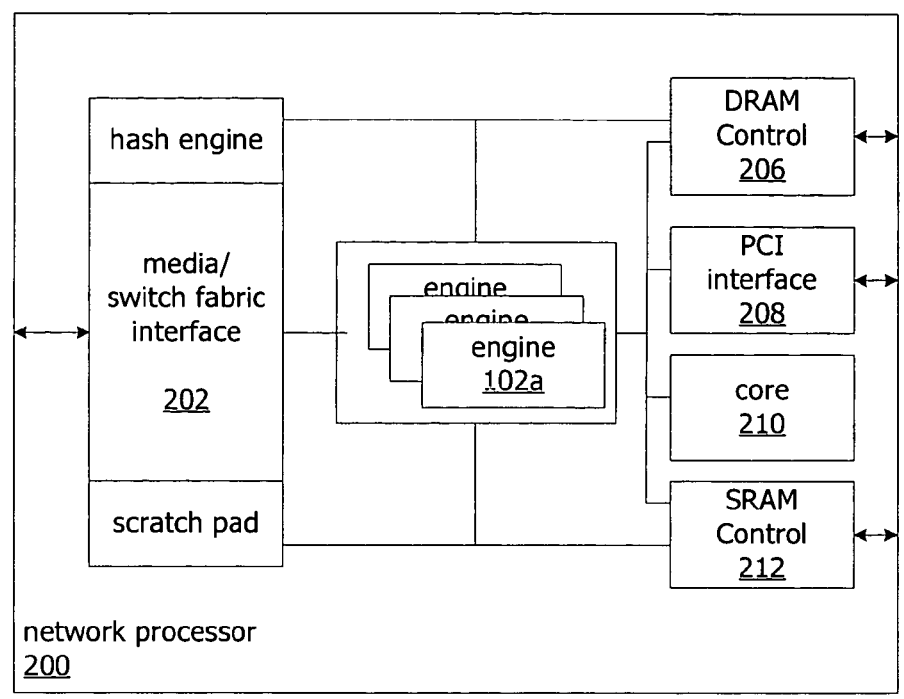
FIG. 6 is a diagram of a processor having multiple engines.

The techniques described above may be implemented in a variety of systems. For example, FIG. 6 depicts an example of network processor 200. The network processor 200 shown is an Intel(r) Internet eXchange network Processor (IXP). Other network processors feature different designs.

The network processor 200 shown features a collection of packet processing engines 102 on a single integrated semiconductor chip. Individual engines 102 may provide multiple threads of execution. As shown, the processor 200 may also include a core processor 210 (e.g., a StrongARM(r) XScale(r)) that is often programmed to perform "control plane" tasks involved in network operations. The core processor 210, however, may also handle "data plane" tasks.

As shown, the network processor 200 also features at least one interface 202 that can carry packets between the processor 200 and other network components. This interface 202 can include the receive buffer shown in FIGS. 4A–4F. For example, the processor 200 can feature a switch fabric interface 202 (e.g., a Common Switch Interface (CSIX)) that enables the processor 200 to transmit a packet to other processor(s) or circuitry connected to the fabric. The processor 200 can also feature an interface 202 (e.g., a System Packet Interface (SPI) interface) that enables the processor 200 to communicate with physical layer (PHY) and/or link layer devices (e.g., MAC or framer devices). The processor 200 also includes an interface 208 (e.g., a Peripheral Component Interconnect (PCI) bus interface) for communicating, for example, with a host or other network processors.

As shown, the processor 200 also includes other components shared by the engines 102 such as a hash engine, internal scratchpad memory shared by the engines, and memory controllers 206, 212 that provide access to external memory shared by the engines. The controllers 206, 212 and/or scratchpad can feature the read and write alignment circuitry described above FIG. 7 illustrates a sample engine 102 architecture. The engine 102 may be a Reduced Instruction Set Computing (RISC) processor tailored for packet processing. For example, the engines 102 may not provide floating point or integer division instructions commonly provided by the instruction sets of general purpose processors.

The engine 102 may communicate with other network processor components (e.g., shared memory) via transfer registers 232a, 232b that buffer data to send to/received from the other components. The engine 102 may also communicate with other engines 102 via neighbor registers 234a, 234b wired to adjacent engine(s).

The sample engine 102 shown provides multiple threads of execution. To support the multiple threads, the engine 102 stores program counters 222 for each thread. A thread arbiter 222 selects the program counter for a thread to execute. This program counter is fed to an instruction store 224 that outputs the instruction identified by the program counter to an instruction decode 226 unit. The instruction decode 226 unit may feed the instruction to an execution unit (e.g., an Arithmetic Logic Unit (ALU)) 230 for processing or may initiate a request to another network processor component (e.g., a memory controller) via command queue 228. The decoder 226 and execution unit 230 may implement an instruction processing pipeline. That is, an instruction may be output from the instruction store 224 in a first cycle, decoded 226 in the second, instruction operands loaded (e.g., from general purpose registers 236, next neighbor registers 234a, transfer registers 232a, and/or local memory 238) in the third, and executed by the execution data path 230 in the fourth. Finally, the results of the operation may be written (e.g., to general purpose registers 236, local memory 238, next neighbor registers 234b, or transfer registers 232b) in the fifth cycle. Many instructions may be in the pipeline at the same time. That is, while one is being decoded 226 another is being loaded from the instruction store 104. The engine 102 components may be clocked by a common clock input.

Figure 8:
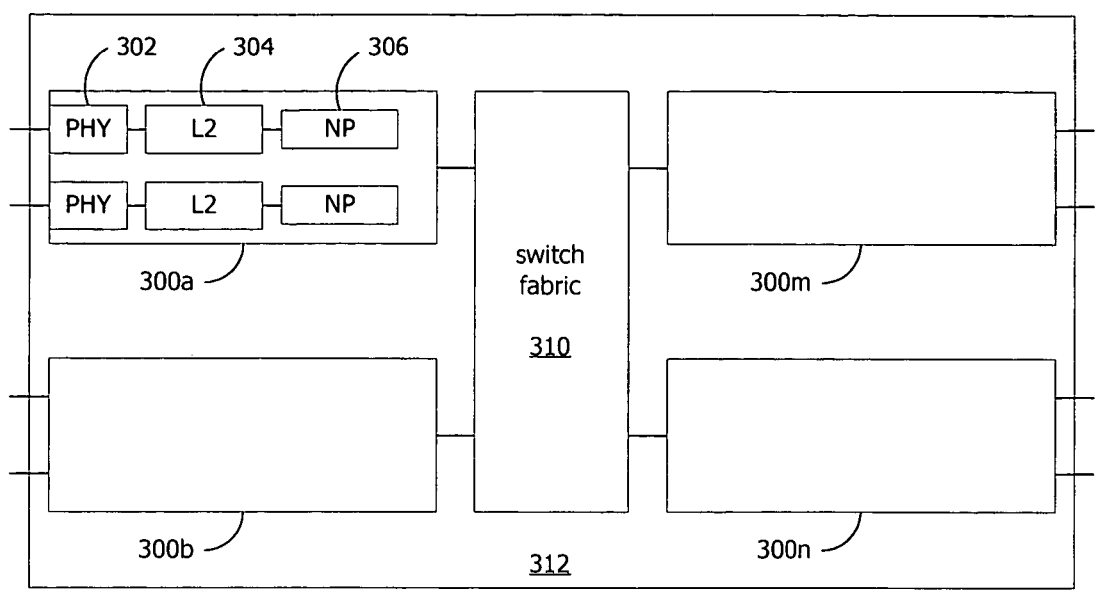
FIG. 8 is a diagram of a network forwarding device.

FIG. 8 depicts a network device 312 incorporating techniques described above. As shown, the device features a collection of line cards 300 ("blades", interconnected by a switch fabric 310 (e.g., a crossbar or shared memory switch fabric). The switch fabric, for example, may conform to CSIX or other fabric technologies such as HyperTransport, Infiniband, PCI, Packet-Over-SONET, RapidIO, and/or UTOPIA (Universal Test and Operations PHY Interface for ATM).

Individual line cards (e.g., 300a) may include one or more physical layer (PHY) devices 302 (e.g., optic, wire, and wireless PHYs) that handle communication over network connections. The PHYs translate between the physical signals carried by different network mediums and the may implement an instruction processing pipeline. That is, an instruction may be output from the instruction store 224 in a first cycle, decoded 226 in the second, instruction operands loaded (e.g., from general purpose registers 236, next neighbor registers 234a, transfer registers 232a, and/or local memory 238) in the third, and executed by the execution data path 230 in the fourth. Finally, the results of the operation may be written (e.g., to general purpose registers 236, local memory 238, next neighbor registers 234b, or transfer registers 232b) in the fifth cycle. Many instructions may be in the pipeline at the same time. That is, while one is being decoded 226 another is being loaded from the instruction store 104. The engine 102 components may be clocked by a common clock input.

FIG. 8 depicts a network device 312 incorporating techniques described above. As shown, the device features a collection of line cards 300 ("blades", interconnected by a switch fabric 310 (e.g., a crossbar or shared memory switch fabric). The switch fabric, for example, may conform to CSIX or other fabric technologies such as HyperTransport, Infiniband, PCI, Packet-Over-SONET, RapidIO, and/or UTOPIA (Universal Test and Operations PHY Interface for ATM).

Individual line cards (e.g., 300a) may include one or more physical layer (PHY) devices 302 (e.g., optic, wire, and wireless PHYs) that handle communication over network connections. The PHYs translate between the physical signals carried by different network mediums and the bits (e.g., "0"- s and "1") used by digital systems. The line cards 300 may also include framer devices (e.g., Ethernet, Synchronous Optic Network (SONET), High-Level Data Link (HDLC) framers or other "layer 2" devices) 304 that can perform operations on frames such as error detection and/or correction. The line cards 300 shown may also include one or more network processors 306 that perform packet processing operations for packets received via the PHY(s) 302 and direct the packets, via the switch fabric 310, to a line card providing an egress interface to forward the packet. Potentially, the network processor(s) 306 may perform "layer 2" duties instead of the framer devices 304.

Figure 7:
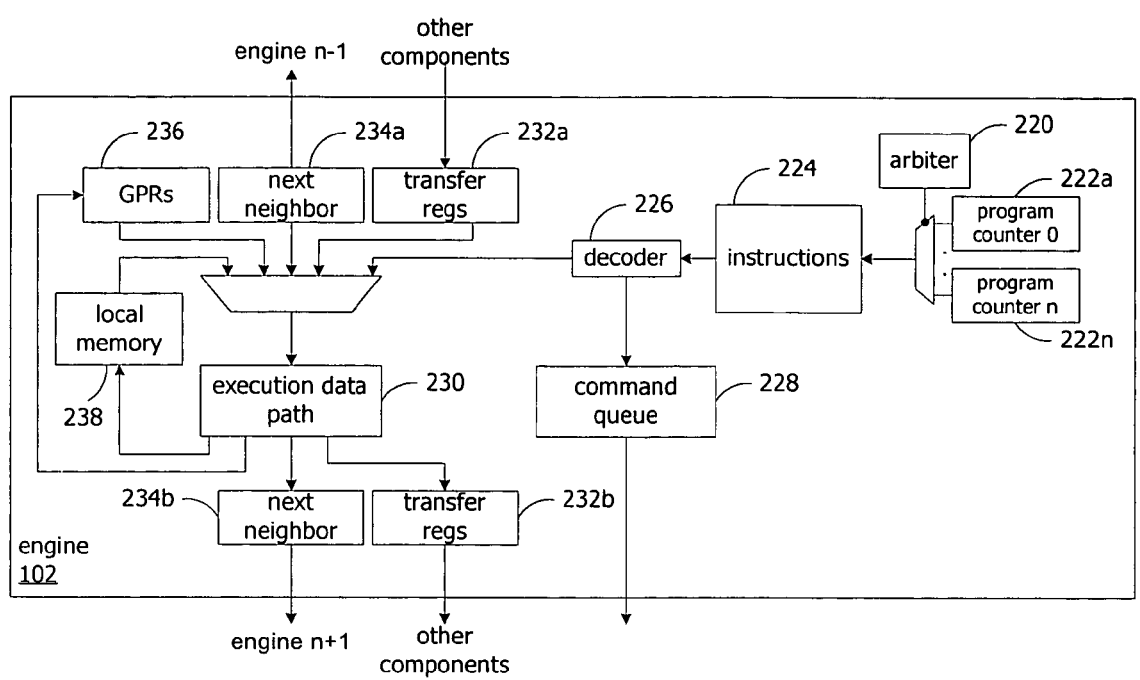
FIG. 7 is a diagram of an engine.

While FIGS. 6–8 described specific examples of a network processor, engine, and a device incorporating network processors, the techniques may be implemented in a variety of hardware, firmware, and/or software architectures including network processors, engines, and network devices having designs other than those shown. Additionally, the techniques may be used in a wide variety of network devices (e.g., a router, switch, bridge, hub, traffic generator, and so forth).

The term packet was sometimes used in the above description to refer to a frame. However, the term packet also refers to a TCP segment, fragment, Asynchronous Transfer Mode (ATM) cell, and so forth, depending on the network technology being used.

The term circuitry as used herein includes hardwired circuitry, digital circuitry, analog circuitry, programmable circuitry, and so forth. The programmable circuitry may operate on computer programs. Such computer programs may be coded in a high level procedural or object oriented programming language. However, the program(s) can be implemented in assembly or machine language if desired.

The language may be compiled or interpreted. Additionally, these techniques may be used in a wide variety of networking environments.

Other embodiments are within the scope of the following claims.

What is claimed is:

1. A memory controller, comprising:
an interface to a first memory;
an interface to a bus coupling the memory controller to at least one processor;
circuitry to:
receive a read command from the bus that identifies read data and a read offset and, in response to the read command, retrieve the read data from the first memory, pad the retrieved read data with a read data prefix and a read data suffix in accordance with the read offset, and transmit the padded retrieved read data via the interface to the bus; and
receive a write command from the bus that identifies write data and a write offset and, in response to the write command, strip a write data prefix and a write data suffix from the write data in accordance with the write offset and store the shifted write data in the first memory.

2. The memory controller of claim 1, wherein the at least one processor comprises a processing engine of a set of multiple processing engines integrated on a single semiconductor chip.

3. A method comprising:
receiving a read command at a memory controller, the read command identifying read data and a read offset;
in response to the read command:
retrieving read data requested by the read command from a memory coupled to the memory controller; and
padding a read data prefix and a read data suffix to the retrieved read data in accordance with the read offset identified by the read command;
receiving a write command at the memory controller, the write command identifying write data and a write offset;
in response to the write command:
stripping a write prefix and a write suffix from the write data in accordance with the write offset; and
writing the stripped write data to the memory coupled to the memory controller.

4. The method of claim 3, wherein the receiving the read command comprises receiving the read command from one of a set of multiple processing engines.

5. The method of claim 3, wherein the padding is based on a memory width of a target memory to receive the retrieved data.

6. A computer program product, disposed on a computer readable medium, the program including instructions for causing a computer to:
receive source instructions and output target instructions that cause a processor to
issue a read command that identifies read data and a read offset that causes a memory controller coupled to the processor to retrieve the read data from the first memory, pad the retrieved read data with a read data prefix and a read data suffix in accordance with the read offset, and transmit the padded retrieved read data; and
issue a write command that identifies write data and a write offset and causes the memory controller to strip a write data prefix and a write data suffix from the write data in accordance with the write offset and store the shifted write data in the first memory.

7. A network processor, comprising:
an interface to at least one component carrying packets between the network processor and a network;
multiple engines; and
a memory controller operationally coupled to the multiple engines, the memory controller comprising:
an interface to a memory;
an interface to a bus coupling the memory controller to the multiple engines; and
circuitry to:
receive a read command from the bus that identifies read data and a read offset and, in response to the read command, retrieve the read data from the memory, pad the retrieved read data with a read data prefix and a read data suffix in accordance with the read offset, and transmit the padded retrieved read data via the interface to the bus; and
receive a write command from the bus that identifies write data and a write offset and, in response to the write command, strip a write data prefix and a write data suffix from the write data in accordance with the write offset and store the shifted write data in the memory.

8. The network processor of claim 7, wherein the multiple engines comprise multiple multithreaded engines.

9. A network forwarding device, comprising:
a switch fabric;
a set of line cards interconnected by the switch fabric, at least one of the set of line cards comprising:
at least one physical layer (PHY); and
at least one processor, the processor comprising:
multiple, multithreaded engines to operate on instructions that cause the multiple, multithreaded engines to issue memory access commands; and
a memory controller comprising:
an interface to a memory;
an interface to a bus coupling the memory controller to the multiple, multithreaded engines; and
circuitry, responsive to memory access commands received over the bus, the circuitry to
receive a read command from the bus that identifies read data and a read offset and, in response to the read command, retrieve the read data from the first memory, pad the retrieved read data with a read data prefix and a read data suffix in accordance with the read offset, and transmit the padded retrieved read data via the interface to the bus; and
receive a write command from the bus that identifies write data and a write offset and, in response to the write command, strip a write data prefix and a write data suffix from the write data in accordance with the write offset and store the shifted write data in the memory.

* * * * *